June 26, 1962 A. B. WALLACE 3,041,005

SPLIT REEL

Filed Feb. 25, 1960

INVENTOR
ALLAN B. WALLACE
BY Pennie, Edmonds, Morton, Barrows & Taylor
ATTORNEYS United States Patent Office 3,041,005
Patented June 26, 1962

3,041,005
SPLIT REEL

Allan B. Wallace, R.D. 1, Box 158, Atlantic Highlands, N.J.

Filed Feb. 25, 1960, Ser. No. 11,001
3 Claims. (Cl. 242—116)

This invention relates to a split reel and more particularly to a split reel assembly which may be easily disassembled in order that a core containing thereon a wound amount of tape may be separately transported.

Video-tape reels currently in use comprise a hub member about which video tape is wound and two large flange members which are integral with the hub member and which serve as ends or sides of the reel. These reels, which weigh on the order of 2–3 lbs., are forwarded to numerous television stations where the reels are placed into reproducers and the contents of the tape transmitted. The tape used and shipped on the individual reels may contain only a "spot" television advertisement which may last only 30 seconds on the TV screen when played through the transmitter. If the "spot" advertisement is one receiving national distribution, it may be necessary to send out many hundreds of reels containing the "spot" which, because of the comparatively heavy weight of the reel, results in considerable shipping expense. Further, because the reels are integral, storage of a number of the reels presents a problem since they take up considerable space. A TV station may have many hundreds of "spot" announcements which are stored so that the size of the reel becomes of considerable importance.

I intend to overcome the aforementioned difficulties existing in the use of conventional reels, particularly those of large shipping weights and excess space requirements, by utilizing a split reel which may be disassembled so that only the core on which the tape is wound need be shipped and which alone is sufficient to adequately store the wound tape. The reel comprises generally a light plastic hollow core, an upper flange section having a segmented upper hub portion and a lower flange section having a lower segmented hub portion. The lower hub portion has a plurality of upstanding hub segments which are adaptable to slide into the inner part of the core. The upper hub portion which has a plurality of segmented hubs which are complementary in shape to the hub segments of the lower hub portion is then placed so that its hub segments will slide into the middle of the core which is resting on the bottom hub portion. The various hub portions and core have keyways and detents whereby when the upper hub portion is joined to the lower hub portion, the separate parts will securely lock together to form a reel assembly.

In addition I provide cutouts on one or both of the flanges whereby the amount of tape on a reel or remaining on a reel when the reel is in a transcriber, can be readily determined. Further I associate index marks with the cutouts so that the amount of tape remaining on the core can be readily checked so that the operator will be able to determine the approximate playing time of tape remaining on the reel.

Referring to the drawings in which a preferred embodiment of my invention is shown, FIG. 1 illustrates an exploded view of the several parts comprising the complete reel assembly;

Figure 1:
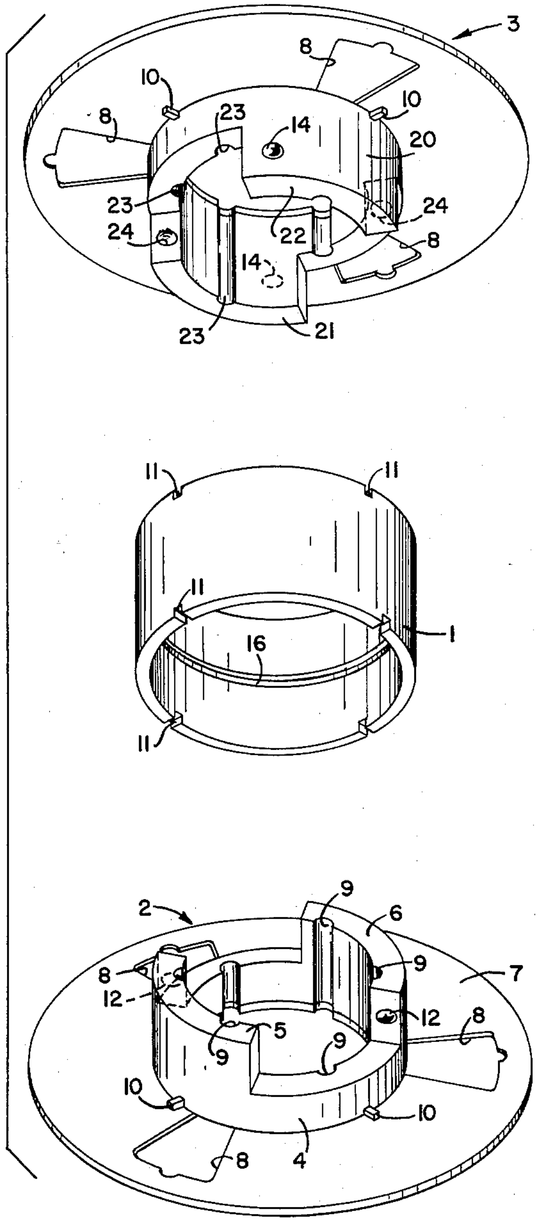

Referring in greater detail to the drawings and in particular to FIG. 1, 1 represents a hollow core about which tape (not shown) may be wound while 2 represents generally a lower flange section and 3 an upper flange section. The lower flange section 2 in turn comprises a lower hub 4 having thereon two upstanding segmented hub portions 5 and 6. A flange 7 is affixed to the lower hub 4 and has therein a plurality of cutouts 8, the purpose of which will be hereinafter explained. The lower hub 4 and segmented portions 5 and 6 have therein a series of keyways 9 which are adapted to receive a key contained on a shaft of a transcriber in order that the shaft may rotate the reel assembly. The flange 7 in addition has thereon radially extending projections or keys 10 which fit into cutouts 11 contained on the core 1 in order to securely lock the core against relative rotation with the lower flange section 2 when the core is mounted thereon.

The upper flange section 3 contains an upper hub 20 having thereon downwardly extending segmented hub portions 21 and 22. Portions 21 and 22 are of a size to fit closely in the space between segmented portions 5 and 6 so that when the two portions are fit together they will present a smooth shaft for the interior of the hollow core 1. The upper hub 20 has keyways 23 which co-operate with keyways 9 of the lower hub to form single keyways which will extend the complete width of the assembled reel.

Figure 3:
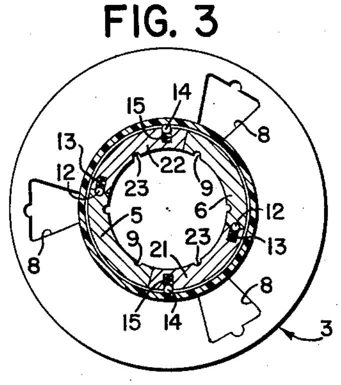
FIG. 3 is a cross-sectional view of the reel assembly of FIG. 2 taken along lines 3—3.

The segmented hub portions 5 and 6 of the lower hub 7 have therein balls 12 as shown in FIG. 3 which are urged outwardly by means of springs 13. The balls 12 are retained in the portions 5 and 6 so that the balls are not completely pushed out of the portions 5 and 6. The balls 12 are adapted to engage corresponding grooves 24 contained in the upper segmented hub portions 21 and 22 in order to lock the upper and lower hub portions together when they are in the assembled positions. While the spring biased balls are shown as being in the lower segmented hub portions, it is apparent that they could as easily be included in the upper segmented hub portions with the corresponding grooves then being in the lower segmented hub portions.

Balls 14 contained in the upper portions 20 and 21 of the upper flange section are urged radially of the hub by means of springs 15 to engage a groove 16 contained on the inner diameter of the core 1. These balls serve to retain the core on the upper flange section when the upper flange section is lifted off of the lower flange section so that the core comes off with the upper section. This facilitates removal of the core from the transcriber and minimizes chances of the tape on the core unravelling.

Figure 4:
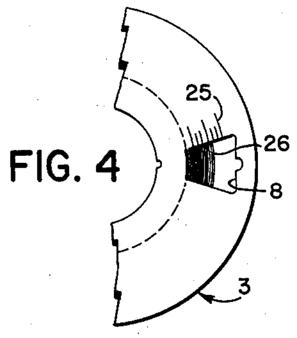
FIG. 4 is a partial view of the top of an assembled reel shown having tape thereon.
Figure 2:
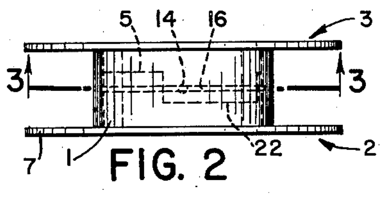
FIG. 2 is a side view of reduced size showing the several parts of FIG. 1 in assembled relation.

The cutouts 8 contained on both the upper and lower reels have index marks 25 marked on the top side of the upper flange section 3 and on the lower side of the lower flange 7. Referring to FIG. 4 which illustrates a portion of the flange of the upper side of the flange section, it is seen that when tape 26 is included on a core that the outside diameter of the tape on the core can be readily seen. If the index marks 25 correspond to a time scale, such as seconds or minutes, it may be readily determined how much playing time of tape remains on the core at any given time. Such index marks may also enable an operator to roughly estimate where a particular portion or spot may be included in a long length of tape when it is wound on the core.

When it is desired to ship tape alone, all that is required to be sent is the core upon which the tape is wound. For this purpose the core can be made of a light material such as Bakelite or other plastic which may fit into a light cardboard shipping carton. Upon receipt at the TV station, the core may be mounted in the transcriber in the following manner: The bottom flange section of the reel is first mounted in the transcriber so that the keyways 9 engage a key on the driving rotor of the transcriber. The core 1 is then slid over the hub portion 4 and segmented portions 5 and 6 so that the cutouts 11 will engage the keys 10 contained in the lower flange section. The upper flange section 3 is then lowered onto the lower section so that the hub portions 20, 21 and 22 will slide into the core 1. At the same time, the upper portion 3 is rotated until the lower segmented portions 21 and 22 will drop down into the space between portions 5 and 6 where the balls 12 will lock the two sections together. At the same time the balls 14 will engage the groove 16 contained in the core.

After the tape has been run through the transcriber and the driving shaft of the transcriber reversed in order to rewind the tape onto the reel assembly, the core is removed with the upper section since balls 14 remain locked in the groove 16. After the core and upper flange sections have been lifted off the transcriber, the core may be moved off the upper flange section merely by exerting a slight pulling force on the core.

While I have described an assembly of the spit reel on a transcriber in which the reel is set horizontally in the transcriber, it is obvious that the reel would work similarly were it used in a transcriber wherein the reel set vertically.

The reel body itself may be made of a sturdy material since weight is not of prime importance. The flanges therefore may be made of a stiffer material than normally used which will minimize bending and chance of subsequent scuffing of the edge of the tape as it leaves the reel. This latter condition is of particular importance when a reel is used with video tape since the edges of the tape contain edit pulses and the audio portions of the tape.

While I have shown spring urged ball locking detents, it is obvious that equivalent locking detents could be used. The foregoing description of the invention is explanatory only and changes in the details of the constructions illustrated may be made by those skilled in the art, within the scope of the appended claims, without departing from the spirit of the invention.

I claim:

1. A split reel assembly comprising a hollow core, cutouts along the top and bottom sides of said core, a lower flange section having a lower segmented hub portion, an upper flange section having an upper segmented hub portion, the segmented hub portions of said upper and lower flange sections being complementary shaped to provide a smooth shaft about which said hollow core fits, keys on said lower section to lockingly engage with said cutouts at one end of said core to prevent relative rotation of said core on the said lower flange section, and first locking means carried in said segmented hub portions for locking said segmented hub portions together.

2. A split reel assembly according to claim 1 wherein said hollow core has an annular groove positioned on the inside thereof, and said upper segmented hub portion has therein a second locking means adapted to engage said annular groove to lock said core to said upper flange section.

3. A split reel assembly according to claim 1 wherein said upper and lower flange sections each have therein a plurality of cutouts and index marks on one side of each of said cutouts extending radially of said assembly reel; said index marks marking the amount of tape carried by said reel.

References Cited in the file of this patent

UNITED STATES PATENTS

| | | |
|---|---|---|
| 793,053 | Clark | June 27, 1905 |
| 1,555,751 | O'Neill | Sept. 29, 1925 |
| 2,164,426 | Renfroe | July 4, 1939 |
| 2,190,013 | Byers | Feb. 13, 1940 |
| 2,271,326 | Bird | Jan. 27, 1942 |
| 2,476,928 | Thomas | July 19, 1949 |
| 2,667,257 | Hurtado | Jan. 26, 1954 |

FOREIGN PATENTS

| | | |
|---|---|---|
| 565,901 | Great Britain | Dec. 4, 1944 |